United States Patent [19]

Steenmetser

[11] 3,778,735

[45] Dec. 11, 1973

[54] TRANSMISSION LINE OF LOW CHARACTERISTIC IMPEDANCE

[75] Inventor: Jean Louis Steenmetser, Paris, France

[73] Assignee: LCC CICE-Compagnie Europeenne des Composants Electroniques, Paris, France

[22] Filed: May 4, 1972

[21] Appl. No.: 250,245

[30] Foreign Application Priority Data

May 25, 1971 France .............................. 7118870

[52] U.S. Cl. .................. 333/84 M, 29/600, 333/31, 333/70 CR

[51] Int. Cl. .......................... H01p 3/00, H01p 3/08

[58] Field of Search .............. 333/84 M, 31, 70 CR; 29/600

[56] References Cited

UNITED STATES PATENTS

| | | | |
|---|---|---|---|
| 3,555,461 | 1/1971 | Ralph | 333/84 M |
| 2,961,623 | 11/1960 | Kuecken et al. | 333/84 M X |
| 2,926,317 | 2/1960 | Blitz | 333/84 M |
| 2,922,968 | 1/1960 | Van Patten | 333/84 M |
| 2,874,276 | 2/1959 | Dukes et al. | 333/84 M |

*Primary Examiner*—Rudolph V. Rolinec
*Assistant Examiner*—Saxfield Chatmon, Jr.
*Attorney*—John W. Malley et al.

[57] ABSTRACT

A transmission line for electrical signals of very low characteristic impedance, produced from a strip of chemically reduced ceramic in order to create a low-resistivity medium, then re-oxidized at the surface in order to produce two films of high dielectric constant, covered with metallized coatings on the dielectric films, and fitted with distribution connections soldered to these coatings for the signals.

8 Claims, 3 Drawing Figures

PATENTED DEC 11 1973 3,778,735

TRANSMISSION LINE OF LOW CHARACTERISTIC IMPEDANCE

The present invention relates to transmission lines of very low characteristic impedance, for electrical signals, which lines are intended more particularly to supply integrated circuits.

The function of transmission lines of this kind is the supply and distribution of signals to receivers distributed along their length and it is therefore necessary, in order to avoid any parisitic reflection and thus to achieve good matching of the lines to the receivers, that the characteristic impedance of the lines as well as their input and output impedances, should be as close as possible to the input impedances of said receivers.

However, in the case where these receivers are in the form of integrated circuits, it is well known that their input impedance is generally very low, so that the characteristic impedance of the distribution line matched to receivers of this kind has to be very low too.

Under these circumstances, the devices conventionally used are transmission lines of the "distributed constant" kind, that is to say that the inductance $L$ and the capacitance $C$ of each line are proportional to the length thereof; these lines are constituted by a thin strip of dielectric material, surrounded at either side by a strip of electrically conductive material. The characteristic impedance of this kind of line, expressed in ohms, is given by the relationship $Z_c = \sqrt{L/C}$ where $L$ and $C$ are respectively expressed in Henrys/metre and Farads/metre. These values depend upon the absolute magnetic permeability $p$ and dielectric constant $d$ of the medium of thickness $e$ located between the two conductive strips, the latter having a width $a$, indeed in accordance with the following relationships :

$$L = p \cdot e/a \quad \text{and} \quad C = d \cdot a/e$$

whence we obtain $Z_c = e/a \cdot \sqrt{p/d}$.

It is clear from this expression that it is possible to reduce the characteristic impedance of a line of this kind to match it to certain kinds of receivers, in particular integrated circuits as stated before, on the one hand by reducing the thickness $e$ of the dielectric strip, although this is only possible within certain limits dictated by technological considerations, and on the other hand by the choice of a material having a dielectric constant $d$ which is very high, for the production of the central strip. However, a major drawback of this last expedient is the resultant reduction in the velocity $V$ of propagation of the signals, which velocity, because of reasons associated with the delay in the distribution of these signals, should remain high; in other words, the value of this velocity, as given by the relationship :

$$V = 1/\sqrt{C \cdot L} = 1/\sqrt{d \cdot p}$$

is thus the lower the higher the dielectric constant $d$.

At last means of achieving the requisite impedance-matching consists in utilizing pure resistances in the form of matching resistors; however, these have the serious drawback that they introduce the risk of attenuation of the effective signals.

The object of the present invention is a transmission line having a very low characteristic impedance, obtained, without the drawbacks hereinbefore referred to, through a "twin structure" design which comprises two elementary structures arranged side by side, each of the conventional kind described above and this twin structure making it possible, in the case of an insulating material having a dielectric constant such that the propagation velocity of the signals is adequate, to achieve a major reduction in the characteristic impedance of the overall structure, as compared with that of the known structures.

More precisely, the transmission line in accordance with the invention is made up of two elementary lines each, as has been stated, made up of a dielectric surrounded by two conductive strips, one of which latter is common to both lines and is constituted by a ceramic strip whose resistivity has been drastically reduced by chemical reaction, the central dielectric of each elementary line having a very small thickness since it is produced by re-oxidation of the aforesaid ceramic strip; the two external conductive strips are in the form of metallized coatings.

The invention will be better understood from a consideration of the ensuing description and the attached drawings in which :

FIG. 1 illustrates a longitudinal section through a transmission line in accordance with the invention.

Figure 1:
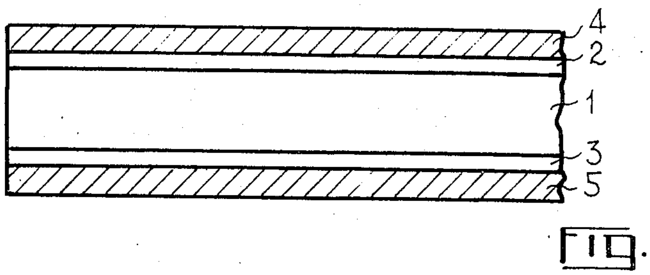
FIG. 1 illustrates a longitudinal section of a transmission line in accordance with the invention.

It is made up by the succession of a first thickness 4 of electrically conductive material, a thin film 2 of a material whose dielectric constant is high, a strip 1 of a low-resistivity material, then a layer 3 and a thickness 5 of materials respectively similar to those constituting zones 2 and 4 .

The strip 1 and the layers 2 and 3 which surround it, will advantageously be produced by successive chemical processing of one and the same material, for example a ceramic strip. It is possible, in a typical case given by way of example, to use a thin ceramic strip based on an alkaline earth titanate, for example such as barium titanate, and having a high dielectric constant, which is chemically reduced in a first process stage at 1,000° in a hydrogen atmosphere, in order to drastically reduce the resistivity of the material and produce the zone marked by the reference 1; during a second stage of the process, the strip is placed in a furnace at 900° in an oxidising atmosphere, which has the effect of re-oxidizing the strip surface which thus recovers its initial state in this surface zone, especially as far as the high dielectric constant is concerned, the re-oxidation being confined to a very small thickness which is a function of the furnace temperature and the pressure of the oxidizing atmosphere; this second stage enables the layers 2 and 3, known as the barrier layers, to be produced.

On the thus processed strip, there are deposited two metallized coatings 4 and 5 in the form, for example, of silver deposits applied using a silk-screen process.

In operation, the line in accordance with the invention can be split into two conventionally structured elementary lines as described hereinbefore, that is to say, lines made up of a dielectric layer, (constituted by the barrier layers 2 and 3) of thickness $e_1$ surrounded by two low-resistivity strips, one of the strips 1 being common to both elementary lines. The characteristic impedance of each elementary line is, as indicated hereinbefore, given by :

$$Z_{1c} = e_1/a \cdot \sqrt{p/d}$$

where $a$ is the common width of the conductive strips and $p$ and $d$ respectively the magnetic permeability and dielectric constant of the barrier layers, that is to say, those of the ceramic strip prior to chemical processing.

It can be shown that the apparent characteristic impedance $Z_c$ between the two external metallized coatings 5 and 6 is that of a line having a thickness $2 \cdot e_1$ and is given for the new structure by the relationship :

$$Z_c = 2 \cdot e_1/a \cdot \sqrt{p/d},$$

or $$Z_c = 2 \cdot Z_{1c}.$$

But, concerning the propagation velocity, the major advantage of this structure is that its value remains :

$$V = 1/\sqrt{d \cdot p}$$

as its depends solely upon the characteristics ($d$ and $p$) of the ceramic utilized; its remains unmodified in relation to that which will be obtained with a line of conventional structure but employing an identical ceramic. The structure of the line in accordance with the invention thus makes it possible to select a material having a dielectric constant $d$ whose value is limited in order to satisfy the conditions imposed by the propagation velocity $V$, whilst at the same time offering the possibility of obtaining a very low value of characteristic impedance $Z_c = 2 \cdot e_1/a \cdot \sqrt{p/d}$, the thicknesses $e_1$, of dielectric constant $d$, obtained by re-oxidation being much smaller than the thickness $e$ which it is technologically possible to obtain, in a conventional structure, for a ceramic strip having the same dielectric constant $d$.

The small value of the thicknesses $e_1$ of the barrier layers 2 and 3, in relation to the thickness $e$ of a dielectric in a conventional structure, means, moreover, a substantial reduction in the width $a$ of the line, whilst obtaining an adequately low value of characteristic impedance.

On the other hand, this twin structure provides different advantages in relation to the conventional structure :

- a major increase in the bandwidth has been observed in experiment, this being particularly significant in the case where an electrical signal form is to be transmitted;
- a very high capacitance per unit length, making it possible to dispense with the addition of filter capacitors, which are normally required for certain receivers, such as high-speed switching circuits.

The signals transmitted by this kind of line are likewise protected against external disturbances by the screening effect produced as a consequence of the line structure itself.

Figures 2, 3:
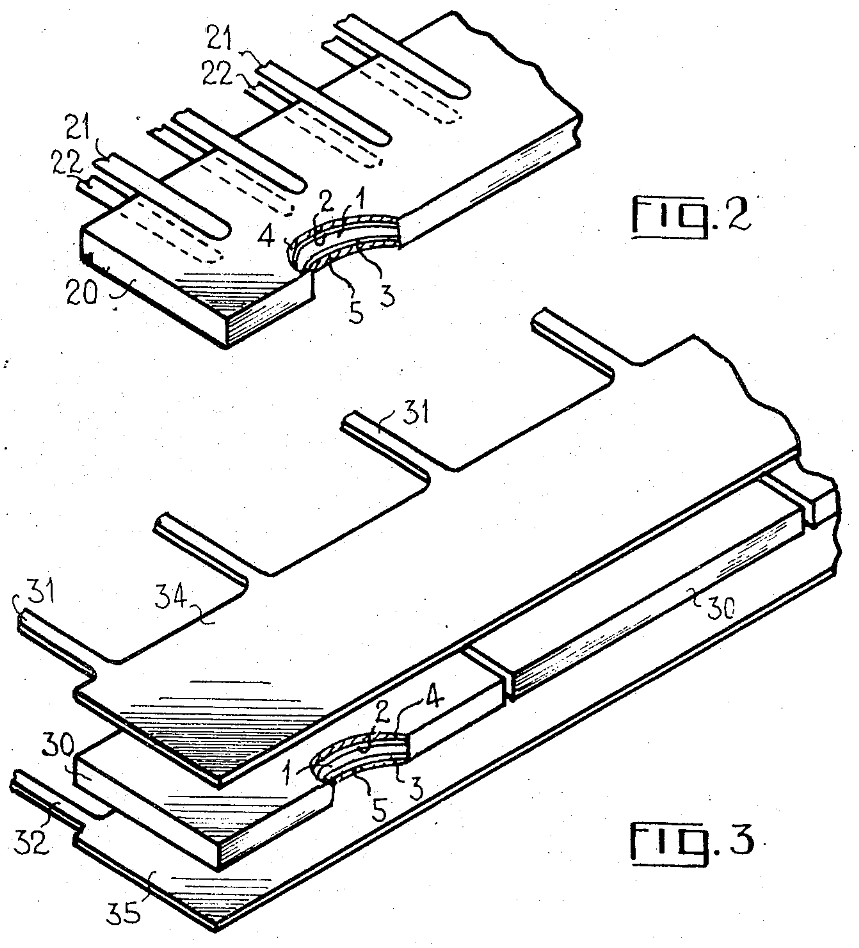
FIG. 2 illustrates an embodiment of connections for the distribution of the transmitted signals.
FIG. 3 illustrates a variant embodiment of a transmission line in accordance with the invention.

FIG. 2 illustrates an embodiment of connections for the distribution of the signals transmitted by the line in accordance with the invention. The line, as described hereinbefore (FIG. 1) is represented in this diagram by a strip 20, and similar reference numbers designate similar elements. The distribution connections 21 and 22 are soldered or stuck to either side of the strip 20 on the metallized coatings 4 and 5 shown in FIG. 1, the assembly constituted by the strip 20 and those parts of the connections 21 and 22 attached to it, being protected and insulated electrically by a resin envelope, for example, or an insulating sheath.

FIG. 3 illustrates a variant embodiment of a transmission line in accordance with the invention.

The line as described in FIG. 1 is illustrated in this diagram by a series of plates 30 produced from the same ceramic strip as hereinbefore indicated, that is to say, successively chemically reduced, surface re-oxidized and metallized, and after that cut into plates 30 in order to counteract the extreme fragility of the material.

The rigidity of the line is achieved by arranging a series of plates 30 between two metal strips 34 and 35 whose length is equal to that of the line, which strips are electrically integrated with the plates 30 by a method such for example as soldering or sticking using a conductive adhesive.

These metal strips 34 and 35 are provided with signal distribution connections, respectively 31 and 32, the assembly constituted by the plates 30 and the strips 34 and 35 being protected and electrically insulated by encapsulation or by a sheath, as before.

In addition, it is possible to produce a transmission line comprising more than two conductors, for example in order to supply receivers with several different voltages. For this purpose it is merely necessary to alternate metal strips similar to that 34, with series of plates 30.

By way of example, the transmission line in accordance with the invention has been produced from a strip of barium titanate several centimetres long and 4 mm wide, having a thickness of 0.4 mm, the thickness $e_1$ of the barrier layers being in the order of 4 microns; its characteristic impedance $Z_c$ is in the order of 0.1 ohms whilst the characteristic impedance of a line of the same geometric configuration, but conventional structure, and produced using the same materials, is an order of magnitude larger at 0.5 ohms ; the propagation velocity of the electrical signals through this kind of line is equal to around $3.86.10^6$ m/s and the line in accordance with the invention has thus distributed such signals with a delay of no more than 47 nanoseconds, the bandwidth being greater than 3 MHz.

Of course, the invention is not limited to the embodiment described and shown which was given solely by way of example.

What is claimed is:

1. A transmission line for electrical signals, including longitudinal layers made on the one hand of a dielectric material and on the other of low-resistivity materials, and comprising distribution connections for said signals, wherein said dielectric material is in the form of two fine dielectric layers separated by a layer of a first material having low resistivity, the latter one and said dielectric layers being assembled in one and the same solid strip of continuous material, and said dielectric layers are each covered with a layer of a second low-resistivity material including a metal, to which said distribution connections are electrically connected.

2. A transmission line as claimed in claim 1, wherein said strip is a ceramic strip, said layer of first low-resistivity material including the central part of said strip and being a chemical reduction of the ceramic of said strip, and said dielectric layers being re-oxidized surface-thin films of said ceramic strip.

3. A transmission line as claimed in claim 1, wherein said layers of the second low-resistivity material are metal deposits on said dielectric layers, and said distribution connections are soldered to said deposits.

4. A transmission line as claimed in claim 1, wherein said layers of the second low-resistivity material are metal strips fixed to said dielectric layers strips in which said distribution connections have been cut.

5. A transmission line as claimed in claim 1, wherein said strip is split up into adjacent plates, the series of said plates being assembled by two metal strips constituting said layers of the second low-resistivity material, in which said distribution connections have been cut.

6. A transmission line as claimed in claim 4 wherein said metal strips are assembled by a metal deposit on said dielectric layers.

7. A transmission line as in claim 5, including a metal deposit on said dielectric layers for assembling said metal strips.

8. Method of manufacturing a transmission line for electrical signals including two fine dielectric layers separated by a layer of a first material having low resistivity, the latter one and said dielectric layers being assembled in one and the same solid strip of continuous material, comprising the distinct following steps:

chemical reduction of a ceramic strip for producing said first material having low resistivity, and re-oxidation of said ceramic strip for producing said fine dielectric layers at its surface, the remaining central part of said strip constituting said layer of a first material.

* * * * *